United States Patent [19]
Myers

[11] 3,874,713
[45] Apr. 1, 1975

[54] COUPLING APPARATUS FOR PIPES

[76] Inventor: Herman A. Myers, 112 N. Liberty, Masontown, Pa. 15461

[22] Filed: May 15, 1973

[21] Appl. No.: 360,571

[52] U.S. Cl............................ 285/340, 285/DIG. 3
[51] Int. Cl.............................................. F16l 11/00
[58] Field of Search ...... 285/DIG. 3, 340, 317, 345, 285/231, 308, DIG. 4; 248/274 A

[56] References Cited
UNITED STATES PATENTS
2,246,750 6/1941 Murphy ......................... 285/DIG. 3
3,796,447 3/1974 de Potter ...................... 285/DIG. 4
FOREIGN PATENTS OR APPLICATIONS
498,350 12/1953 Canada........................... 285/DIG. 3

*Primary Examiner*—Patrick D. Lawson
*Attorney, Agent, or Firm*—Webb, Burden, Robinson & Webb

[57] ABSTRACT

A coupling apparatus for joining fluid bearing pipes comprising a coupling housing having pipe receiving end portions and a bore extending therethrough. O-ring seals are positioned within the bore of the housing adjacent the ends thereof to sealably engage the outer periphery of the pipes thus preventing fluid leakage around the pipes. Various embodiments of a mechanical lock means are employed in association with the housing for biased gripping interaction between the housing and the adjacent pipes to prevent longitudinal movement of the joined pipes relative to the housing.

6 Claims, 8 Drawing Figures

COUPLING APPARATUS FOR PIPES

My invention relates generally to pipe coupling devices and more particularly to coupling devices for fluid bearing pipes in which joints can be made without the need of solder, chemical adhesives, cement, weldment or other, like conventional joining techniques.

My invention provides an inexpensive coupling apparatus, which, in various embodiments, is particularly suited for many types of fluid bearing pipe, such as: copper tubing in plumbing applications; plastic sewer pipe; high pressure gas, chemical, hydraulic and water pipes; automotive piping, to mention a few.

My invention further provides a coupling apparatus which in its various embodiments may be used for joining either high or low pressure pipes of large and small diameter in a fast and economical manner.

Still further, my invention provides a coupling apparatus which eliminates costly threaded joints presently used in many applications thus eliminating the need for time consuming threading and flaring operations and the associated hardware.

My invention further provides a coupling apparatus for joining pipes in any joint configuration, such as: linear, elbow, T or Y.

My invention still further provides a coupling apparatus which permits the quick disassembly of the joined pipes without the need for conventional solder sweating, unthreading, destructive sawing or torch cutting, or the like.

Briefly, my invention provides a coupling apparatus for joining lengths of fluid bearing pipe. The coupling apparatus comprises a coupling housing having a plurality of pipe receiving end portions, and a bore extending therethrough in communication with the end portions. A plurality of groove portions are formed around the circumference of the bore, at least one groove positioned adjacent each of the pipe receiving bore ends of the housing. O-ring seals are positioned within the groove portions of the housing bore, adapted to sealably contact the outer circumference of the joined pipes to prevent fluid leakage therefrom. A mechanical lock means is, likewise, provided. The mechanical lock means is associated with the coupling housing, providing a gripping interaction between the housing and the adjacent pipe sections to prevent longitudinal movement of the joined pipes relative to the housing. The mechanical lock means includes a detachable spring clip embodiment which is particularly useful for general purpose joining applications such as with copper tubing for plumbing uses. Also included as the mechanical lock means is a spring member integrally attached to the coupling housing, especially suitable for joining plastic sewer pipe. The mechanical lock means also includes a tiltable, lock washer arrangement which is capable of withstanding high tensile forces making it particularly suitable for joining pipes carrying high pressure fluids.

Figure 1:
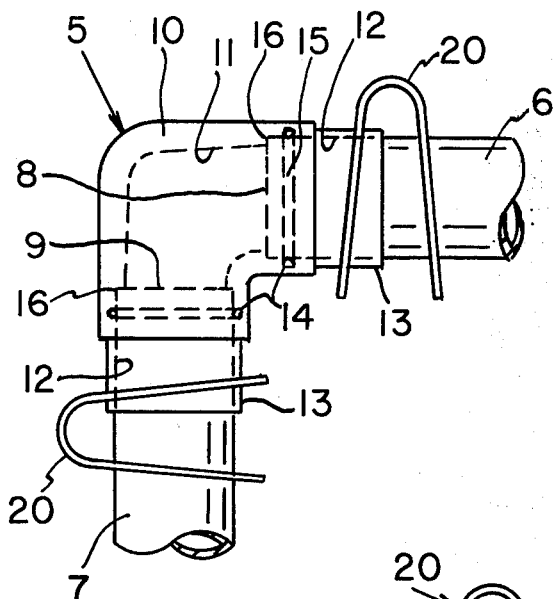
FIG. 1 is a side elevation of one presently preferred embodiment of my invention showing two pipe sections joined in an elbow configuration.

In FIG. 1, the coupling apparatus of my invention, generally designated 5, is shown in an elbow-like configuration with pipes 6 and 7 joined thereto. This embodiment is particularly suited for use with pipes carrying relatively low pressure fluid, such as in most plumbing applications which utilize copper tubing. Coupling apparatus 5 comprises a coupling housing 10 which has two pipe receiving end portions 13 and a bore 11 extending therethrough and communicating with the end portions 13. Bore 11 of housing 10 has pipe receiving end portions 12 formed of a particular diameter so as to closely receive the ends of pipe sections 6 and 7 therewithin. Coupling housing 10 also has two groove portions 14 formed around the circumference of the pipe receiving bore 12. Each of said grooves 14 are positioned adjacent pipe receiving ends 13 of the housing 10. Two O-ring seals 15 are also provided, and are each positioned within the groove portion 14 of housing bore 12. Seal rings 15 are adapted to sealably contact the outer circumference of the pipes 6 and 7 so as to prevent fluid leakage. Hence, once pipes 6 and 7 are inserted into housing 10 the fluid is sealed within coupling housing 10 by virtue of the tightly fitting O-ring seals 15. The O-ring seals 15 may be constructed of conventional rubber or silicon material depending upon the wear and pressure requirements of the application.

Figure 2:
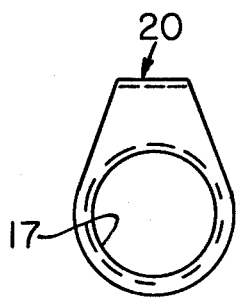
FIG. 2 is a plan view of the spring clip which is used on the embodiment of FIG. 1.
Figure 3:
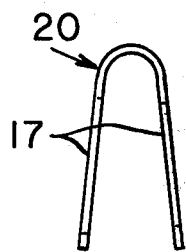
FIG. 3 is a side view of the spring clip of FIG. 2.

Still referring to FIG. 1, pipes 6 and 7 are mechanically locked in place, in relation to housing 10, by virtue of spring clips 20. Spring clip 20 may be formed from sheet metal stock, preferably a spring tempered stainless steel. Spring clip 20 is formed in a generally U-shape arrangement, when viewed from the side as in FIG. 3, with the open end of the U being of greater width than the closed end of said U-shape. Spring clip 20 also has a hole 17 formed through each of the two legs of the U-shape, FIG. 2. Holes 17 of spring clip 20 are formed to slidably receive and release the outer peripheries of coupling housing end 13 and pipes 6 and 7. In this regard, one of holes 17 may be formed of a slightly larger diameter than the other in order to accommodate the larger diameter housing end 13. In order to assemble the coupling apparatus 5 of FIG. 1, the open ends of spring clip 20 are forceably urged toward one another so as to align holes 17 with respect to one another. Spring clip 20 is then inserted onto pipe receiving end portion 13 of housing 10 and, simultaneously, pipe 6 or 7 is inserted into pipe receiving bore 12. Once pipe 6 has been fully inserted into housing 10 to a desired degree, at least, past O-ring 15, pressure is released from the open end portions of spring clip 20, which then causes spring clip 20 to return toward its original open U-shape, FIG. 1. Once in this position, the edges of holes 17 of spring clip 20 grippingly engage portions of the outer surface of housing end portion 13 and portions of the outer surface of pipe 6 or 7 so as to prevent longitudinal movement therebetween. Once in the locked position, the legs of spring clip 20 rest in a biased relationship relative to housing end 13 and pipe 6 or 7. If for some reason the joint is to be disassembled, the reverse procedure is followed. A force is reapplied to the open ends of spring clip 20 in order to urge holes 17 into an aligned position, which then allows the easy removal of pipe 6 or 7 from coupling housing 10.

The coupling housing 10 may also contain an annular shoulder portion 16 positioned inwardly from and in spaced relationship to O-ring 15. Annular shoulder portion 16 is formed within the housing bore 11 and is of a smaller diameter than the outer diameter of pipes 6 and 7 so as to act as a bearing surface stop for terminal ends 8 and 9 of pipes 6 and 7.

It can be appreciated that the coupling apparatus 5 of FIG. 1 can be adapted to fit any conventional plumbing joint application, for example, T joints, Y joints, and lineraly extending joints. In any of these other joint constructions the construction as shown in the elbow joint of FIG. 1 would be applied. That is to say, each pipe receiving end portion 13 of housing 10 would contain a closely aligned bore portion 12 to receive the pipe and an O-ring 15 placed within a groove portion 14 adjacent said pipe receiving end portion 13. In like manner, spring clip 20 would also be applied to the pipe receiving end portion 13 and to the pipe, as shown and described in FIG. 1.

Figure 5:
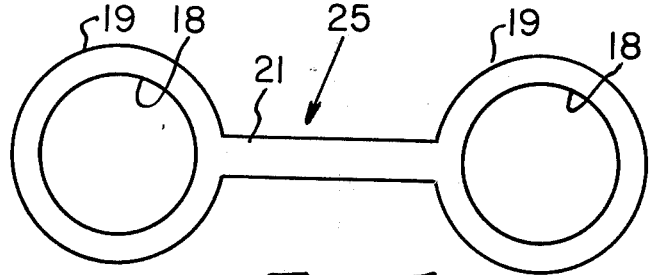
FIG. 5 is a plan view of the spring member of FIG. 4 showing it in an unsprung condition.
Figure 4:
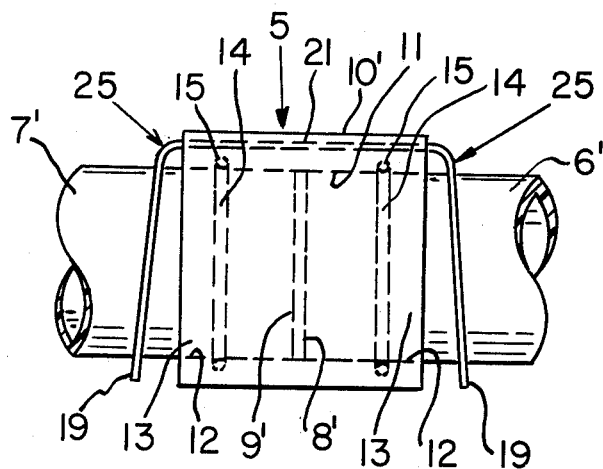
FIG. 4 is a side elevation of another presently preferred embodiment of my invention exhibiting a linearly extending coupling housing and a modified spring member grippingly engaging the joined pipe sections.

Turning next to FIGS. 4 and 5, another presently preferred embodiment of my coupling apparatus 5 is shown. The embodiment of FIG. 4 is particularly suited for use in joining larger diameter, plastic sewer pipes, designated 6' and 7'. In laying and joining plastic sewer pipe, the conventional joining technique has employed the use of a chemical cement or adhesive, generally an epoxy compound. This conventional technique has many drawbacks, especially if it is necessary to dismantle the pipe from the joint. Following the conventional practice, the pipe and joint are generally damaged or destroyed when this is performed. My coupling apparatus 5 solves the problems heretofore encountered in joining and dismantling plastic sewer pipes by providing a fluid tight joint which is also highly resistant to tensile forces and, in addition, permits easy and quick dismantling of the pipes from the joint coupling without damaging the pipes or the coupling housing. Hence, with my device, the pipes and housing may be reused after the joint has been dismantled.

In FIG. 4, coupling housing 10' is constructed in a linearly extending configuration to permit end to end joining of pipe sections 6' and 7'. By slight modification it can be also adapted to join pipes in elbow, T or Y joints as well. Coupling housing 10' has a bore 11 extending therethrough. The pipe receiving end portions 12 of bore 11 are formed to closely receive end portions 8' and 9' of pipes 6' and 7', respectively. As in the embodiment of FIG. 1, coupling housing 10' contains groove portions 14 formed around the circumference of bore 12 positioned adjacent pipe receiving ends 13 of housing 10'. O-ring seals 15 are positioned within grooves 14 to sealably contact the outer circumference of the pipes 6' and 7' in order to prevent fluid leakage around the pipes. While only one O-ring 14 is shown positioned adjacent pipe receiving ends 13 in the drawings, it is, of course, understood that several grooves 14 and O-rings 15 may be utilized adjacent each pipe receiving end 13 of housing 10'. Such back-up O-rings may be used in any or all of the embodiments described herein if necessary, to create a more fluid impervious seal or in order to keep dirt and grime away from the main seal area 14. Likewise, a back-up metal snap type ring may be utilized with O-ring 14 if higher fluid pressures cause some deformation of O-ring 14.

Coupling housing 10' also includes a mechanical locking arrangement in the form of biasing spring member 25. Spring member 25 is shown in FIG. 5 in an unbent position, as it would appear after the stamping operation in manufacture. Member 25 is preferably constructed of a spring tempered stainless steel and is fixedly attached to coupling housing 10' by any conventional fastening method such as bolting, welding or the like. In applications wherein plastic sewer piping is to be joined, housing 10' is preferably constructed of a plastic material. In such a construction,, intermediate section 21 of spring member 25 could be integrally molded into a longitudinally extending wall portion of housing 10' as in FIG. 4. Member 25 has end portions 19 interconnected by intermediate section 21, which extend beyond the pipe receiving ends 13 of housing 10' at least a distance greater than the diameter of pipes 6' and 7'. End portions 19 of member 25 each have a pipe receiving hole 18 formed therethrough. Holes 18 are adapted to slidably receive and release the outer periphery of pipes 6' and 7' when the end portions 19 of member 25 are forceably urged toward pipe receiving ends 13 of housing 10'. In order to insert pipes 6' and 7' into housing 10', end portions 19 of member 25 are bent downward to an extent where holes 18 are aligned with their respective pipe receiving bore 12. After the pipes 6' and 7' are fully inserted into housing 10', i.e., when their respective ends 8' and 9' have passed O-ring seals 15, end portions 19 of spring member 25 are released, causing portions 19 to spring outwardly from pipe receiving ends 13 of housing 10'. In the locked position of FIG. 4, the edges of holes 18 in spring member 25 grippingly engage portions of the outer periphery of pipes 6' and 7' so as to prevent longitudinal movement of said pipes relative to coupling housing 10'. Once in the locked position, end portions 19 of member 25 rest in a biased relationship relative to pipes 6' and 7'. While coupling housing 10' of FIG. 4 is shown and described as linearly extending, it can be modified to accommodate other joint configurations such as elbow, T or Y joints. An additional pipe receiving end 13 would be added to housing 10' which would be sealed and locked in the same manner as just described.

Figure 6:
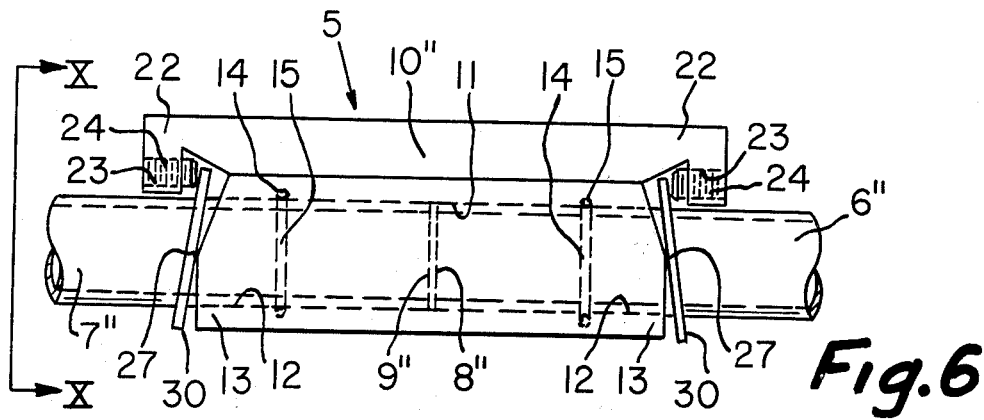
FIG. 6 is a side elevation of an additional presently preferred embodiment of my invention, suitable for high pressure applications, showing the tiltable lock washers in gripping engagement with the joined pipe sections.
Figure 7:
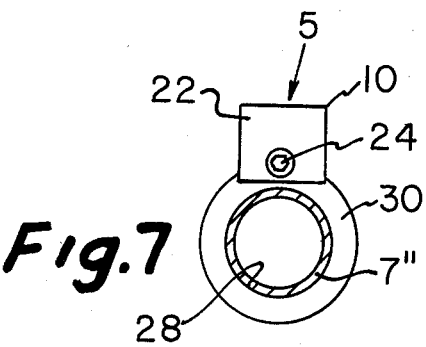
FIG. 7 is a partial section taken along line VII—VII of FIG. 6.

In FIGS. 6 and 7, coupling apparatus 5 as shown is particularly suitable for high pressure pipe joining applications wherein fluid pressures reach 150 psig and over. Such applications require a pipe joint capable of withstanding high tensile forces. In this embodiment, coupling housing 10'', as in the prior embodiments, has a bore 11 extending therethrough and pipe receiving bore portions 12 which are formed to closely receive pipes 6'' and 7'' therewithin. As in the prior embodiments, O-ring seals 15 are positioned within groove portions 14 adjacent pipe receiving ends 13 of housing 10''. Also associated with high pressure coupling housing 10' are locking washers 30, each adapted to be positioned at pipe receiving ends 13 of housing 10', around pipes 6'' and 7''. Washers 30 have a pipe receiving bore 28 formed therethrough. In this embodiment, housing 10'' also includes a raised surface portion 27 outwardly extending from and formed by intersecting planes at the pipe receiving ends 13 and adapted to engage washers 30 along a line of contact, substantially along a diameter of washers 30. Housing 10' also includes beam portion 22 outwardly extending from housing 10' beyond washer 30 on each pipe receiving end 13 of housing 10''. Each terminal end of beam 22 has a threaded bore 23 extending therethrough; the longitudinal axis of bore 23 is positioned substantially perpendicular to the plane of the washers 30, i.e., also substantially parallel to the longitudinal axis of pipes 6'' and 7''. Screws 24, preferably of the Allen set screw type, are threadably inserted into bore 23 of beam 22 so as to engage a portion of the flat surface of adjacent washer 30 so as to forceably urge washer 30 into biased locking engagement with the outer periphery of pipes 6'' and 7'' when screws 24 are rotatably moved toward the coupling housing 10''.

Hence, it can be seen that when screw 24 is rotatably moved toward coupling housing 10'', raised bearing surface portion 27 engages washer 30 at its midpoint and acts as a fulcrum upon the engaged surface of the washer 30 causing washer 30 to biasly tilt relative to the longitudinal axis of the pipes 6'' and 7''. The edges of bore 28 of washer 30 are forceably biased into gripping engagement with the outer periphery of the pipes 6'', 7'', thus preventing longitudinal movement of said pipes relative to coupling housing 10''. In reverse fashion, the joint can be dismantled by simply unscrewing screw 24 from washer 30. As a result of the high mechanical advantage developed by the interaction of screw 24 on washer 30 and the fulcrum of raised surface portion 27 it can be appreciated that the embodiment of FIG. 6 yields a pipe joint which is capable of withstanding extremely high fluid pressures. As in the prior embodiments, coupling apparatus 5 of FIGS. 6 and 7 can easily be modified to accommodate other joint configurations such as elbow, T or Y joints. In such a modification, housing 10'' would receive an additional pipe receiving end portion 13 with a pipe receiving bore 12 and O-ring 15 therein. The washer 30, biasing lock, would also be employed in the modified coupling, as previously described.

Figure 8:
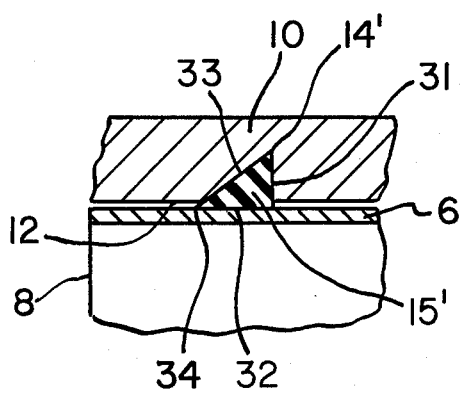
FIG. 8 is a partial sectional view of a modified groove portion positioned within the bore of the coupling housing showing a cross section of a modified O-ring seal mounted within.

A slightly modified version of the O-ring seal is depicted in FIG. 8. Modified O-ring 15' is particularly useful when larger diameter pipes are to be joined and sealed and may be used in conjunction with any of the embodiments of my coupling apparatus 5, described herein. Due to the large diameters, usually 12 inches and over, these pipes sometimes contain rough or irregular surfaces. Such an irregular surface sometimes presents sealing problems when conventional O-rings, having circular cross sections, are employed. Modified O-ring 15' effectively seals such large diameter pipes even when surface imperfections are directly in contact with the O-ring seal. In this embodiment it is necessary to form a modified groove 14' around the circumference of pipe receiving bore 12 of housing 10 in order to accommodate the modified shape of O-ring 15'. The cross sections of groove 14' and O-ring 15' are in the shape of a right triangle. The first leg 31 of the triangle being substantially perpendicular to the bore 12 of housing 10. The second leg 32 of the triangle substantially coincides with the surface of bore 12 and the hypotenuse leg 33 of the triangular cross section slopes outwardly from leg 31 toward the bore 12. Hypotenuse 33 and second leg 32 of the triangular cross section of modified O-ring 15' define a flexible sealing portion 34 of seal ring 15'. Flexible portion 34 is positioned toward the interior of the housing 10 away from the pipe receiving end 13 of housing 10, and, hence, toward the high pressure terminal end 8 of the joined pipe 6. In this position, flexible sealing portion 34 of modified O-ring 15' is subject to the high pressure side of the seal apparatus. If an imperfection were present on the surface of the pipe 6, high pressure fluid would seep from open end 8, between the pipe 6 and bore 12 up to and between flexible portion 34 of modified O-ring 15' and groove 14' thus forcing flexible portion 34 into sealing engagement against any imperfection in pipe surface 6. Hence, modified O-ring 15', with its flexible portion 34, yields a very satisfactory seal, particularly when surface imperfections are present on the pipe surfaces.

I claim:
1. A coupling apparatus for joining lengths of fluid bearing pipes comprising:
   A. a coupling housing having a plurality of pipe receiving end portions and a bore extending therethrough communicating with the end portions, said end portions adapted to receive the pipes which are to be joined therewith, said housing also including a plurality of raised surface portions each located at a pipe receiving end thereof;
   B. sealing means positioned within the pipe receiving bore portions of the coupling housing to sealably contact the outer circumference of the pipes to prevent fluid leakage around said pipes;
   C. a plurality of rigid, washer members each having a pipe receiving bore therethrough and adapted to be placed adjacent a pipe receiving end of said coupling when said pipes are inserted into the coupling; and
   D. means associated with the housing for forceably urging a portion of each washer toward the pipe receiving end of the housing whereby each raised surface portion of the housing acts as a fulcrum upon a surface of the washer causing the washer to biasly tilt relative to the longitudinal axis of the pipe so as to force the edge of the bore of the washer into gripping engagement with the outer periphery of the pipe to prevent longitudinal movement of said pipes relative to the coupling housing.

2. The coupling apparatus of claim 1 wherein the means for urging the washers against the pipes includes a plurality of beams, each outwardly projecting from a pipe receiving end of the coupling housing and extending beyond said washers, each of said beams having a threaded bore therethrough, the longitudinal axis of said bore positioned substantially perpendicular to the plane of the washer face, a plurality of screws, each threadably inserted into the bore of a beam, an end of each of said screws adapted to engage a face portion of the adjacent washer to forceably urge said washer into biased locking engagement with the outer periphery of the pipe when said screw is rotatably moved toward the coupling housing.

3. The coupling apparatus of claim 1 wherein the sealing means includes a plurality of groove portions formed around the circumference of the housing bore, at least one groove positioned adjacent each of the pipe receivingg ends of the bore, said sealing means also including a plurality of O-ring seals, each of said ring seals positioned within a groove portion of the housing bore, said ring seals adapted to sealably contact the outer circumference of the pipes to prevent fluid leakage around said pipes.

4. The coupling apparatus of claim 3 wherein a plurality of groove portions containing O-ring seals are positioned within each of the pipe receiving ends of the housing bore.

5. The coupling apparatus of claim 3 wherein the groove portions and O-ring seals each have a cross sectional shape substantially like that of a right triangle, the first leg of the triangle being substantially perpendicular to the bore of the housing, the second leg of the triangle coinciding with the surface of the bore and the hypotenuse of the triangular cross section sloping outwardly from the first leg to the second leg terminating at the bore, a portion of the O-ring seal formed by the intersection of teh hypotenuse and second leg defining a flexible sealing portion, said flexible portion of said ring seal facing away from the pipe receiving end portions of the housing bore whereby said portion may be flexibly influenced by the pressurized fluid within said housing bore.

6. The coupling apparatus of claim 1 wherein the coupling housing also has a plurality of annular shoulder portions formed within the housing bore of smaller diameter than the outer diameter of said pipes, each of said shoulder portions positioned in spaced relationship from said sealing means and adapted to act as a bearing surface stop for the ends of the pipes when said pipes are inserted into the coupling housing.

* * * * *